(12) United States Patent
Zhang

(10) Patent No.: US 9,619,089 B2
(45) Date of Patent: Apr. 11, 2017

(54) CAPACITIVE TOUCH PANEL, MANUFACTURING METHOD OF CAPACITIVE TOUCH PANEL AND DISPLAY DEVICE

(71) Applicant: BOE TECHNOLOGY GROUP CO., LTD., Beijing (CN)

(72) Inventor: Mi Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/347,091

(22) PCT Filed: Oct. 16, 2013

(86) PCT No.: PCT/CN2013/085268
§ 371 (c)(1),
(2) Date: Mar. 25, 2014

(87) PCT Pub. No.: WO2014/183375
PCT Pub. Date: Nov. 20, 2014

(65) Prior Publication Data
US 2015/0153875 A1 Jun. 4, 2015

(30) Foreign Application Priority Data
May 15, 2013 (CN) .......................... 2013 1 0179042

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC ........ G06F 3/044; G06F 3/0416; G06F 3/041; G06F 3/0418; G06F 3/0488;
(Continued)

(56) References Cited

U.S. PATENT DOCUMENTS

2011/0063537 A1* 3/2011 Kim et al. ...................... 349/42
2011/0109568 A1* 5/2011 Wu et al. ...................... 345/173
(Continued)

FOREIGN PATENT DOCUMENTS

CN 102081486 A 6/2011
CN 102768604 A 11/2012
(Continued)

OTHER PUBLICATIONS

International Search Report mailed Feb. 27, 2014; PCT/CN2013/085268.
(Continued)

*Primary Examiner* — Md Saiful A Siddiqui
(74) *Attorney, Agent, or Firm* — Ladas & Parry LLP

(57) ABSTRACT

Embodiments of the present invention relate to a capacitive touch panel, a manufacturing method of the capacitive touch panel and a display device using this capacitive touch panel. The capacitive touch panel includes a color filter substrate and an array substrate disposed oppositely, the array substrate comprising touch sensing lines and touch scanning lines crossing each other disposed thereon; the color filter substrate is provided with touch sensing auxiliary electrodes over intersections of the touch sensing lines and the touch scanning lines; and the touch sensing auxiliary electrodes are connected with the touch sensing lines.

7 Claims, 3 Drawing Sheets

(58) Field of Classification Search
CPC .. G06F 3/04883; G06F 3/04886; G06F 3/045; G06F 2203/04103; G06F 2203/04111; G06F 2203/04112
See application file for complete search history.

(56) References Cited

U.S. PATENT DOCUMENTS

| | | | |
|---|---|---|---|
| 2011/0141035 A1* | 6/2011 | Hung et al. ................... 345/173 |
| 2011/0205180 A1* | 8/2011 | Han et al. ..................... 345/174 |
| 2011/0291977 A1* | 12/2011 | Moriwaki ......... G02F 1/136286 |
| | | | 345/173 |
| 2013/0278513 A1* | 10/2013 | Jang .............................. 345/173 |

FOREIGN PATENT DOCUMENTS

| CN | 103294312 A | 9/2013 |
|---|---|---|
| CN | 203232406 U | 10/2013 |

OTHER PUBLICATIONS

Written Opinion of the International Searching Authority dated Feb. 15, 2014; PCT/CN2013/085268.
International Preliminary Report on Patentability Appln. No. PCT/CN2013/085268; dated Nov. 17, 2015.

* cited by examiner

CAPACITIVE TOUCH PANEL, MANUFACTURING METHOD OF CAPACITIVE TOUCH PANEL AND DISPLAY DEVICE

TECHNICAL FIELD

Embodiments of the present invention relate to a capacitive touch panel, a manufacturing method of the capacitive touch panel and a display device using the capacitive touch panel.

BACKGROUND

Thin film transistor liquid crystal displays (TFT-LCDs) have been broadly applied in various electronic products such as TV sets, mobile telephones and displays and become dominant in the flat panel display field due to their advantages such as stable pictures, vivid images, radiation elimination, space saving and energy saving; and at present TFT-LCDs with touch functions have been also more and more broadly used.

In prior art, depending on constitution structures, TFT-LCDs with touch functions are classified into: add-on mode touch panels, on-cell touch panels, and in-cell touch panels. For an add-on mode touch panel, the touch panel and the liquid crystal display are produced separately and then attached together to form a liquid crystal display with touch function. Add-on touch panels suffer disadvantages of high manufacturing costs, low light transmission rate, thick module and so on. While for in-cell touch panels, touch electrodes of the touch panel are embedded inside the liquid crystal display, which can reduce the overall thickness of a module and also greatly decrease manufacturing costs of the touch panel, winning much attention from panel manufacturers.

At present, conventional capacitive in-cell touch panels are implemented as illustrated in FIG. 1 by adding additional touch scanning lines 6 and touch sensing lines 7 directly on conventional array substrates, that is, manufacturing two layers of strip-like ITO (Indium Tin Oxides) transparent electrodes that intersect each other in different planes and work as touch driving electrodes and touch sensing lines of the touch panel respectively, and coupling capacitors are formed at the intersections of two ITO transparent electrodes in different planes. The operation process of this kind of touch panel is: detecting voltage signals coupled out by the touch sensing lines via coupling capacitors when touch driving signals are applied to the ITO transparent electrodes serving as touch driving electrodes. In this process, when a finger touches the panel, the body electric field will act on the coupling capacitors to change the capacitance values of relevant coupling capacitors, and in turn change voltage signals coupled out by the touch sensing lines. The location of touch point can be determined depending on the change of voltage signals.

However, the conventional capacitive in-cell touch panels suffer the following problems: capacitances between various electrodes in the liquid crystal cell may influence the coupling capacitances in touch determination and hence influence sensitivity and accuracy of touch determination; in the case where gate lines and data lines for realizing display function and touch scanning lines and touch sensing lines for realizing touch function are interleaving together, not only the aperture ratio of pixels is decreased, but also the difficulty of manufacturing touch liquid crystal displays is increased, and possible process defects will increase accordingly.

SUMMARY

Embodiments of the present invention provide an in-cell capacitive touch panel that can avoid influence of capacitance between various electrodes in a liquid crystal cell on coupling capacitor in touch determination, thereby improving sensitivity and accuracy of touch determination and improving user experience. Furthermore, embodiments of the present invention further provide a manufacturing method of the capacitive touch panel and a display device using this capacitive touch panel.

One aspect of the present invention provides a capacitive touch panel comprising a color filter substrate and an array substrate disposed oppositely, the array substrate comprising touch sensing lines and touch scanning lines crossing each other disposed thereon; the color filter substrate is provided with touch sensing auxiliary electrodes over intersections of the touch sensing lines and the touch scanning lines; and the touch sensing auxiliary electrodes are connected with the touch sensing lines.

Preferably, for example, the touch sensing lines are located above the touch scanning lines; support posts are formed on the color filter substrate and the touch sensing auxiliary electrodes are formed on surfaces of both the color filter substrate and the support posts and connected with the touch sensing lines.

Preferably, for example, the array substrate comprises a plurality of pixel units defined by the data lines and the gate lines; and the gate lines are the touch scanning lines and the data lines are the touch sensing lines.

Preferably, for example, the gate lines, a gate insulating layer and the data lines are disposed in order on the array substrate; and the touch sensing auxiliary electrodes are connected with the data lines.

Preferably, for example, a passivation layer is further disposed on surfaces of the data lines; passivation layer via holes corresponding to the support posts in terms of location and profile are formed on the passivation layer and the touch sensing auxiliary electrodes are connected with the data lines through the passivation layer via holes.

Preferably, for example, a black matrix is disposed on the color filter substrate; the support posts are located in regions corresponding to the black matrix, and the sensing auxiliary electrodes do not extend beyond regions corresponding to the black matrix.

Preferably, for example, the touch sensing auxiliary electrodes are ITO transparent electrodes or IZO transparent electrodes.

Another aspect of the present invention further provides a method for manufacturing any one of the above-mentioned capacitive touch panels including: forming a color filter layer and a black matrix on a second substrate; forming support posts in regions corresponding to the black matrix; forming touch sensing auxiliary electrodes configured to be connected with data lines on the array substrate on surfaces of the black matrix and the support posts.

Preferably, for example, the manufacturing method of the capacitive touch panel further includes: forming gate lines and a gate insulating layer on a first substrate; forming data lines and a passivation layer on the gate insulating layer; forming passivation layer via holes on the passivation layer over intersections of the gate lines and the data lines. The support posts formed in regions corresponding to the black matrix correspond to locations of the passivation layer via holes; and the touch sensing auxiliary electrodes are connected with the data lines through the passivation layer via holes.

Yet another aspect of the present invention further provides a display device including any of the above-mentioned capacitive touch panels.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiment I

Figure 1:
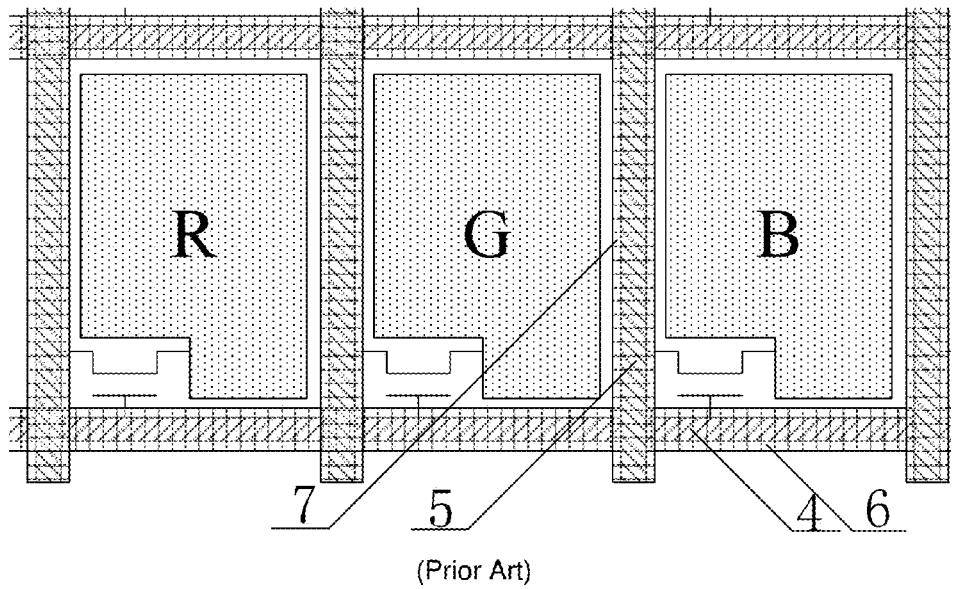
FIG. 1 is a structural view of a capacitive touch panel in prior art.
Figure 2:
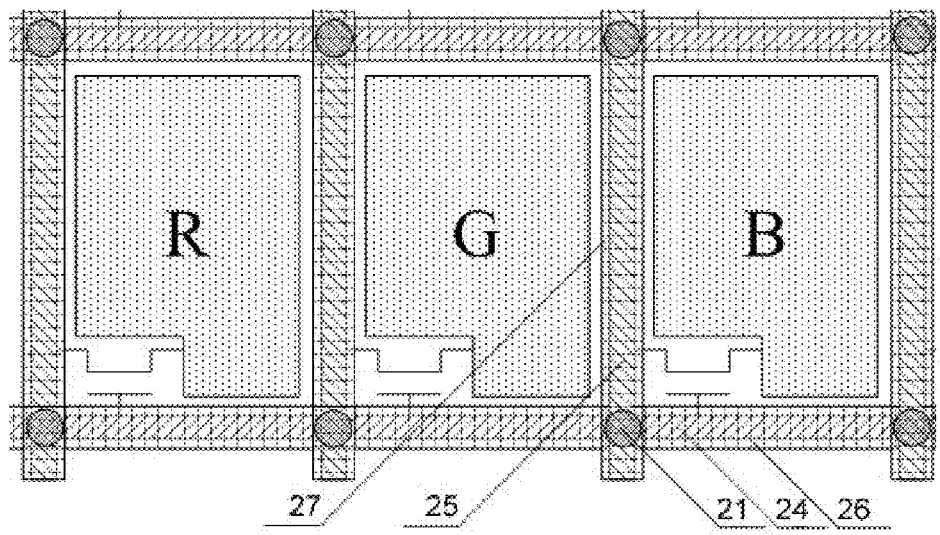
FIG. 2 is a structural top view of a capacitive touch panel in embodiment I of the present invention.

As illustrated in FIG. 2, the capacitive touch panel provided in this embodiment includes a color filter substrate and an array substrate disposed opposite to each other. The array substrate comprises pixel units defined by data lines 25 and gate lines 24 arranged crossing each other. Touch sensing lines 27 and touch scanning lines 26 crossing each other are further provided on the array substrate to implement the touch determination function. To facilitate human electric field to act on touch sensing lines 27, touch sensing lines 27 are generally located above touch scanning lines 26. One of the main improvements of the embodiment of the present invention lies in that touch sensing auxiliary electrodes 21 are provided, over intersections of touch sensing lines 27 and touch scanning lines 26, on the color filter substrate and are connected with touch sensing lines 27. In this way, upon a finger touching the panel, via a touch sensing auxiliary electrode, the finger acts on a touch sensing line 27 connected therewith, thereby causing coupling capacitance between the touch sensing line 27 and the touch scanning line 26 to change, and in turn influencing change of voltage signals. Therefore, it is possible to determine the location of a touch point by detecting variation of voltage signals. Since the above process is equivalent to the case in which the human electric field acts on touch sensing lines 27 directly, avoiding influence of capacitance between electrodes in the liquid crystal cell on coupling capacitors in touch determination, hence improving sensitivity and accuracy of touch determination and finally realizing the effect of improving user's experience.

Figure 3:
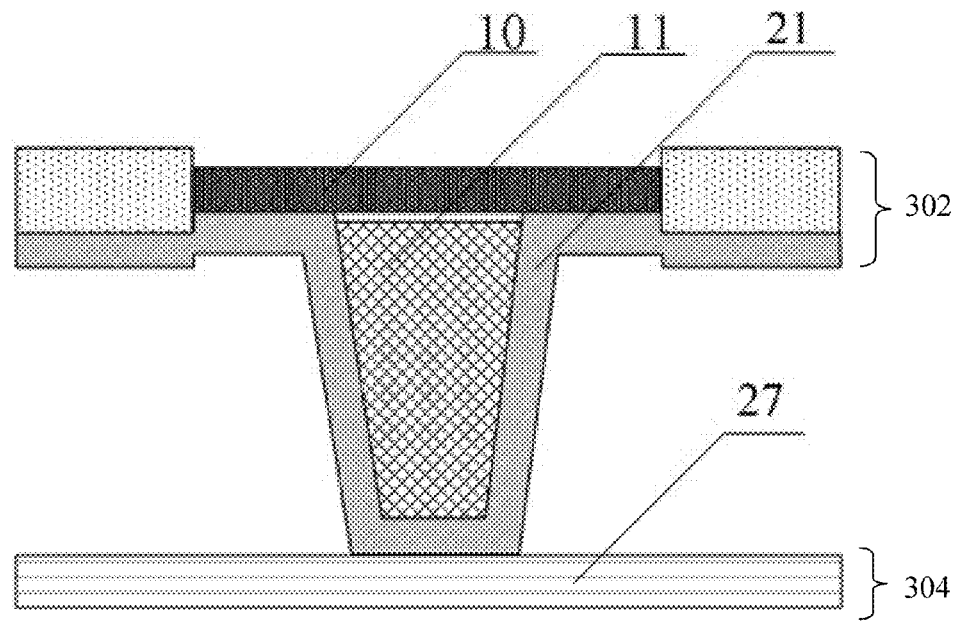
FIG. 3 is a sectional schematic diagram of the capacitive touch panel in FIG. 2.

As illustrated in FIG. 3, a color filter layer is disposed on the color filter substrate 302 corresponding to a pixel unit region, and a black matrix 10 is disposed on the color filter layer; support posts 11 are formed on the color filter substrate 302 with one end formed on the array substrate 304 and the other end contacting the color filter substrate 302, for controlling and maintaining the cell gap (thickness) of the liquid crystal cell; in order to prevent support posts 11 from influencing liquid crystal alignment of the liquid crystal layer contacting them to cause light leak and reduction of contrast in the display area, the support posts 11 are preferably disposed in regions corresponding to the black matrix 10. Of course, depending on different design requirements, it is also possible to dispose support posts at locations corresponding to other regions of the color filter substrate 302. The touch sensing auxiliary electrodes 21 are each formed on the surfaces of both the color filter substrate 302 and the support posts 11. A touch sensing auxiliary electrode 21 stands upside down on a support post 11 as a "hat" as a whole with its edge formed on the color filter substrate 302 and its bottom connected with a touch sensing line 27. In order to avoid influencing normal picture display, the above-mentioned edge of the "hat" preferably does not extend beyond a region corresponding to the black matrix 10 (not illustrated). Since the above-mentioned bottom of the hat are directly connected with the touch sensing line 27, the contact area between the touch sensing auxiliary electrode 21 and the touch sensing line 27 is increased. Of course, connections between touch sensing auxiliary electrodes 21 and touch sensing lines 27 are not limited to the configuration in this example. For example, leads may be disposed between touch sensing auxiliary electrodes 21 and touch sensing lines 27 to connect touch sensing auxiliary electrodes 21 and touch sensing lines 27 via the leads.

Since touch sensing auxiliary electrodes 21 are located in the regions corresponding to the black matrix 10 that is not used during normal display of a display panel, touch sensing auxiliary electrodes 21 may be formed of a transparent material or a metal material, either of which will not influence normal display of the display panel. In this embodiment, the touch sensing auxiliary electrodes 21 may be ITO (Indium Tin Oxide) transparent electrodes or IZO (Indium Zinc Oxide) transparent electrodes, or may be ITO and IZO composite transparent electrodes or other transparent electrodes that can be used to realize the embodiment of the present invention. When the touch sensing auxiliary electrodes 21 are formed of a metal, it is possible to effectively reduce resistance.

With the capacitive touch panel provided in the embodiment of the present invention, because touch sensing auxiliary electrodes are disposed, over the intersections between touch sensing lines and touch scanning lines, on the color filter substrate and connecting touch sensing auxiliary electrodes and touch sensing lines, when a finger touches the panel, the human electric field will act on the touch sensing auxiliary electrodes and the touch scanning lines connected therewith directly, avoiding influence of the capacitors between electrodes in the liquid crystal cell on coupling capacitance in touch determination, which thus increases sensitivity and accuracy of touch determination and realize the effect of improving user's experience finally.

Embodiment II

Figure 4:
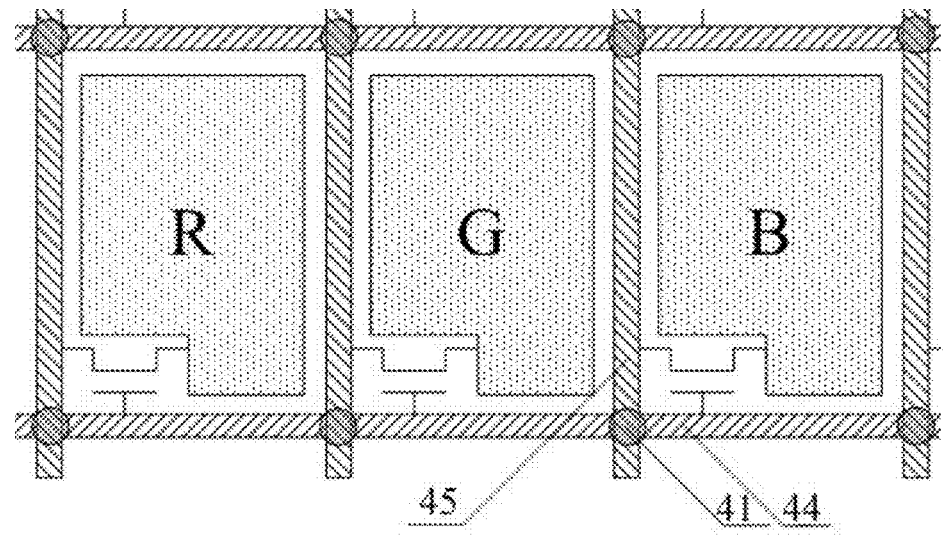
FIG. 4 is a structural top view of a capacitive touch panel in embodiment II of the present invention.

As illustrated in FIG. 4, the capacitive touch panel provided in this embodiment mainly includes a color filter substrate and an array substrate disposed oppositely. Data lines 45 and gate lines 44 crossing each other are disposed on the array substrate and define a plurality of pixel units. Touch sensing auxiliary electrodes 41 are disposed on the color filter substrate and over intersections between the gate lines 44 and the data lines 45, and are connected with touch sensing auxiliary electrodes 41. The gate lines 44 may also serve as touch scanning lines, or the data lines 45 may also serve as touch sensing lines, or the gate lines 44 also serve as touch scanning lines and the data lines 45 also serve as touch sensing lines. In this embodiment, the gate lines 44 also serve as touch scanning lines and the data lines 45 also serve as touch sensing lines. In a touch scanning stage, when a finger touches the panel, since the touch sensing auxiliary electrodes 41 are connected with the data lines 45, the human electric field will change the overlap capacitance between the data lines 45 and the gate lines 44 and in turn influence variation of voltage signals. Therefore, by detecting variation of voltage signals, it is possible to determine the location of a touch point. Combining a gate line and a touch scanning line as one gives rise to the most intuitive effect of greatly reducing wiring layout density, increasing pixel aperture ratio due to the omission of touch scanning lines, and also steps of manufacturing process of touch panel are reduced, difficulty of technology is reduced, and yield of products is improved. Moreover, since gate lines 44 are used for driving touch determination in addition to driving display, only one gate line driving chip is needed, and no additional driving chip is needed for touch display, which saves costs and facilitates separating driving display stage and touch determination stage. A time division driving mode allows the touch determination stage to be performed other than the display stage, which avoids mutual interference between these stages and improves accuracy of touch determination and quality of display. Combining a data line and a touch sensing line as one can not only share one data chip in an image display stage and a touch determination stage, but also further reduce wiring layout density, increase aperture ratio of pixels and can reduce steps of manufacturing process of the touch panel as well and lower the process difficulty.

Figure 5:
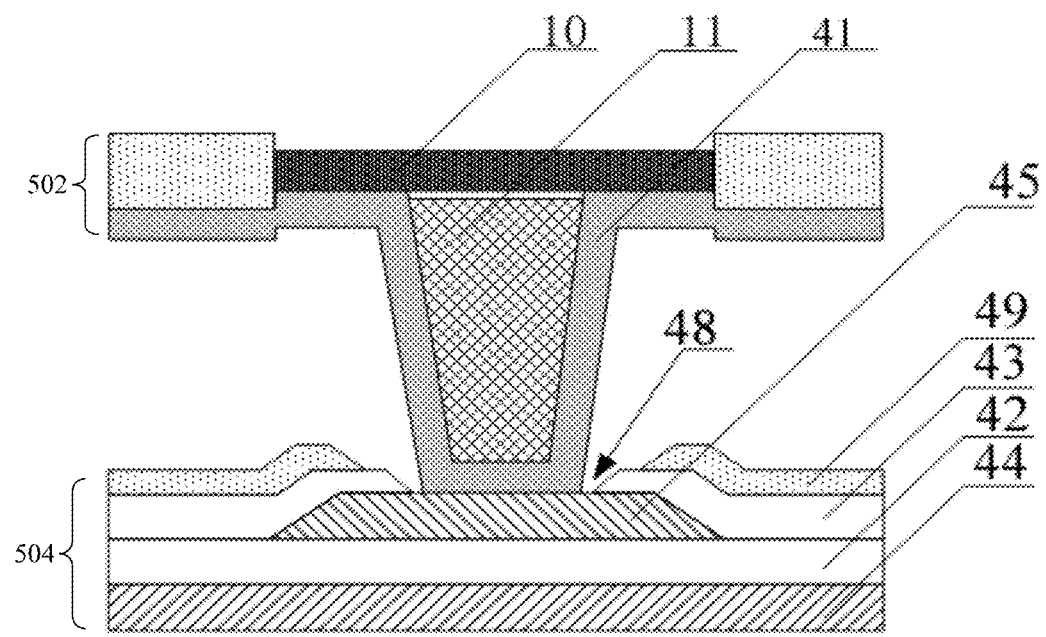
FIG. 5 is a sectional schematic diagram of the capacitive touch panel in FIG. 4.

As illustrated in FIG. 5, the part about the color filter substrate 502 and the part about the touch sensing auxiliary electrodes 42 are similar to those in embodiment I. On the array substrate 504, gate lines 44, a gate insulating layer 42 on the gate lines 44, data lines 45 on the gate insulating layer 42, a passivation layer 43 on the data lines 45 for protecting the data lines 45, and pixel electrodes 49 formed on the passivation layer 43 are provided. On the passivation layer 43 are formed passivation layer via holes 48 over the intersections of the data lines 45 and the gate lines 44, and the passivation layer via holes 48 correspond to the support posts 11 in terms of location and profile, and the touch sensing auxiliary electrodes 41 are connected with the data lines 45 through the passivation layer via holes 48.

An embodiment of the present invention further provides a method for manufacturing the above-mentioned capacitive touch panel mainly including steps of:

forming patterns of a color filter layer and a black matrix 10 on a second substrate by patterning;

forming support posts 11 in regions corresponding to the black matrix 10 by patterning;

forming touch sensing auxiliary electrodes 41 to be connected with data lines 45 on the array substrate on the black matrix 10 and the external surfaces of the support posts 11 by patterning.

Where it is required to form a passivation layer on the data lines, the manufacturing method of a capacitive touch panel in this embodiment includes steps of:

forming patterns including gate lines 44, a gate insulating layer 42, data lines 45, pixel electrodes 49 and a passivation layer 43 on a first substrate by patterning;

forming passivation layer via holes 48 on the passivation layer 43 over intersections of gate lines and data lines 45 by patterning to expose part of data lines 45;

forming patterns of a color filter layer and a black matrix 10 on a second substrate by patterning;

forming support posts 11 corresponding to locations of the passivation layer via holes in regions corresponding to the black matrix 10 by patterning;

forming touch sensing auxiliary electrodes 41 connected with data lines 45 via the passivation layer on the black matrix 10 and the external surfaces of the support posts 11 by patterning.

It is to be noted that in practice, implementation methods may be changed by adding or subtracting the number of patterning, selecting different material or combination of materials to realize the present invention.

Embodiment III

An embodiment of the present invention further provides a display device including the above-mentioned capacitive touch panel. Since the above-mentioned capacitive touch panel has high aperture ratio of pixels, good display quality, highly accurate touch determination, and less steps of manufacturing, the display device including the above-mentioned capacitive touch panel can improve user experience and reduce production costs.

The above-mentioned display device may be any products or parts with display function such as liquid crystal display panels, electronic paper, liquid crystal TVs, liquid crystal displays, digital picture frames, mobile telephones and flat computers.

The above implementations are only for explaining the present invention rather than limiting the present invention, one of ordinary skill in the art can make various variations and modifications without departing from the spirit and scope of the present invention. Therefore all equivalent technical proposals fall within the protection scope of the present invention.

The invention claimed is:

1. A capacitive touch panel comprising a color filter substrate and an array substrate disposed oppositely, the array substrate comprising touch sensing lines and touch scanning lines crossing each other disposed thereon;

wherein the color filter substrate is provided with support posts and touch sensing auxiliary electrodes, the touch sensing auxiliary electrodes being formed on surfaces of the support posts, both the support posts and the touch sensing auxiliary electrodes are being formed over intersections of the touch sensing lines and the touch scanning lines; and the touch sensing auxiliary electrodes are directly electrically connected with the touch sensing lines and the touch sensing auxiliary electrodes are electrically insulated from the touch scanning lines, wherein the touch sensing lines are located above the touch scanning lines; and the touch sensing auxiliary electrodes are formed on surfaces of both the color filter substrate and the support posts and connected with the touch sensing lines.

2. The capacitive touch panel of claim 1, wherein the array substrate comprises a plurality of pixel units defined by the data lines and the gate lines; and the gate lines are the touch scanning lines and the data lines are the touch sensing lines.

3. The capacitive touch panel of claim 2, wherein the gate lines, a gate insulating layer and the data lines are disposed in order on the array substrate; and the touch sensing auxiliary electrodes are connected with the data lines.

4. The capacitive touch panel of claim 2, wherein a passivation layer is further disposed on surfaces of the data lines; passivation layer via holes corresponding to the support posts in terms of location and profile are formed on the passivation layer and the touch sensing auxiliary electrodes are connected with the data lines through the pass nation layer via holes.

5. The capacitive touch panel of claim 1, wherein a black matrix is disposed on the color filter substrate; and the support posts are located in regions corresponding to the black matrix.

6. The capacitive touch panel of claim 1, wherein the touch sensing auxiliary electrodes are indium tin oxide (ITO) transparent electrodes or indium zinc oxide (IZO) transparent electrodes.

7. A display device comprising the capacitive touch panel according to claim 1.

* * * * *